March 24, 1942.  B. W. SCOTT  2,277,154
CONVEYER FEEDER
Filed April 6, 1940
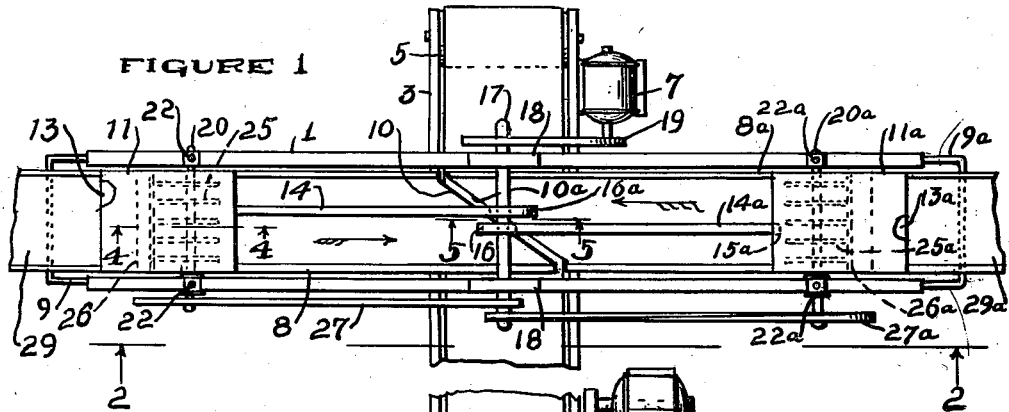
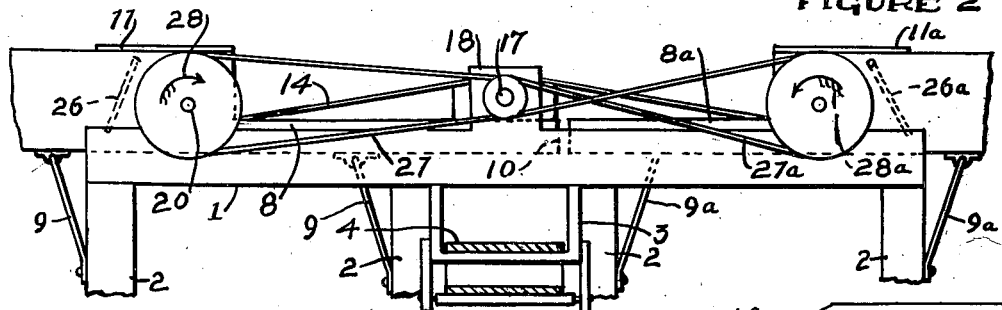
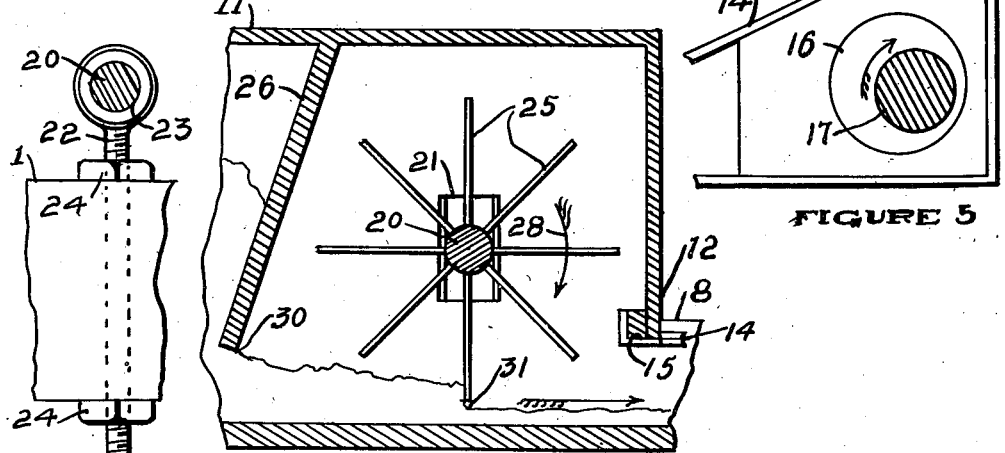
INVENTOR
Byron W. Scott
John A. Naismith
ATTORNEY Patented Mar. 24, 1942

2,277,154

UNITED STATES PATENT OFFICE 2,277,154

CONVEYER FEEDER

Byron W. Scott, near Los Gatos, Calif.

Application April 6, 1940, Serial No. 328,352

3 Claims. (Cl. 198—59)

In meeting the demands of certain markets it is necessary to mix dried fruits such as apricots, prunes, pears, peaches and other products in varying proportions, and it is one object of the present invention to provide a machine whereby such products may be thoroughly mixed in the proportions desired.

It is another object of the invention to provide a machine of the character indicated that will be simple in form and construction, economical to manufacture, that will operate continuously with unvarying accuracy, that will be light in weight, strong, durable, and highly efficient in its practical application.

In the drawing:

Figure 1 is a plan view of a device embodying my invention, with parts broken away.

Figure 2 is a side elevation of the same on line 2—2 of Figure 1, with parts broken away.

Figure 3 is an enlarged detail of the adjusting means for the flow control device.

Figure 4 is an enlarged section on line 4—4 of Figure 1.

Figure 5 is an enlarged section on line 5—5 of Figure 1.

In the particular embodiment of the invention herein disclosed, I show at 1 a horizontal oblong framework supported on legs 2.

At 3 I show another oblong horizontal framework passing immediately under frame 1 at its center and at right angles thereto as shown. The frame 3 is for the purpose of carrying a belt 4 on rollers 5, the belt being driven in the direction indicated by arrow 6 by the motor drive 7.

A horizontal chute 8 is mounted on frame 1 through the medium of flexible supports 9, the discharge end of the chute being angularly disposed at 10 so that material falling therefrom will be distributed over the entire width of the underlying belt 4.

A housing 11 is erected on the chute a little distance back from its discharge end, the forward end of the housing extending down to approximately the top of the chute as at 12 and the other end being left open as indicated at 13.

At 14 is shown a pitman connected to the housing at 15, its forward end having a circular bearing member 16 rotatively mounted therein. The bearing member 16 is eccentrically mounted on a shaft 17, and the shaft 17 is mounted to rotate in upstanding members 18 on frame 1. The shaft is rotated by motor drive 19.

At 20 is shown a horizontally disposed shaft passing through vertical slots in the sides of housing 11 as at 21 and rotatively mounted in the top ends of screws 22 as at 23. The screws 22 pass vertically through the sides of frame 1 and are adjustable by means of nuts 24.

On the shaft 20 and within the housing 11 are mounted a number of radially disposed fingers 25 of equal length, and depending from the top of the housing rearwardly of the fingers 25 is a baffle 26.

A belt and pully drive 27 connects the shafts 17 and 20 so that when the machine is in operation the shaft 20 and fingers 25 are rotated in the direction indicated by arrow 28. The rotation of shaft 17 also imparts a shaking movement to the chute 8 through the medium of the pitman 14.

The result of the construction described is, that when fruit is dumped into the end 29 of the chute 8 the bulk of it is held back by the baffle 26 but the shaking movement of the chute causes it to flow slowly under the bottom edge of the baffle as indicated at 30. Since it is desired to have the fruit flow along on the bottom of the chute in a single layer the fingers 25 are adjusted in proper spaced relation to the bottom of the chute to throw back the excess fruit and permit but a single layer to flow by as indicated at 31. The flow is so controlled at this point that if any excess fruit does pass the fingers the shaking and advancing movement operates to work it down into place on the chute bottom.

When the fruit reaches the discharge end of the chrute 8 it falls upon the moving belt 4, and since the said discharge end is at an angle extending the full width of the said belt the fruit is distributed evenly thereover.

The structure shown at 8a to 27a, inclusive, is identical with that described but disposed in opposed relation thereto, the belt drive 27a being reversed so that the fingers 25a will rotate in the direction indicated by arrow 28a.

When, therefore, it is desired to secure a uniform mixture of two dried fruits such as prunes and apricots, it is only necessary to adjust the fingers 25 to the proper height to effect the proper feeding of one fruit, and fingers 25a to the proper height to effect the proper feeding of the other fruit, set the machine in motion, and then keep each chute supplied with the fruit for which it is adjusted. The two fruits will be simultaneously discharged uniformly on the belt 4, and consequently will be perfectly mixed when discharged from the belt into a container.

I have above described but one complete unit adapted to effect the mixture of two fruits only, but by adding other units over the same belt it is clear that a machine may be constructed to mix not only two, but four, six or more different fruits.

Although but one specific embodiment of the invention has been herein illustrated and described, it will be understood that various alterations in the details of construction and mode of application may be made without departing from the scope of the invention as indicated in the accompanying claims.

I claim:

1. In a device of the character described, a horizontal traveling belt, a shaking chute disposed at a right angle thereto with an angular discharge end extending over the width of the belt, means operative to shake the chute and move material thereover to its discharge end, and means operative to control the quantity of material flowing over the chute.

2. In a device of the character described, a flat, oblong traveling conveyer, a flat bottomed shaking chute disposed at right angles thereto with an angular discharge end extending over the width of the conveyer, means operative to shake the chute and move material thereover to its discharge end, and means operative to limit the thickness of the material flowing over the chute.

3. In a device of the character indicated, the combination of a supporting structure having a horizontally traveling belt mounted thereon, a flat bottomed chute disposed at right angles thereto with an angular discharge end extending over the width of the belt, means operative to shake the chute and move material thereover to its discharge end, a vertically adjustable shaft rotatably mounted over the chute and provided with radially disposed fingers disposed to contact and displace excess material in the chute, means operative to rotate said shaft and fingers rearwardly with respect to the direction of movement of the material in the chute, and a baffle disposed in the chute to regulate movement of material therein to the last mentioned means.

BYRON W. SCOTT.